(12) United States Patent
Hughes

(10) Patent No.: US 11,313,738 B2
(45) Date of Patent: Apr. 26, 2022

(54) APPARATUS FOR MEASUREMENT OF ATMOSPHERIC TEMPERATURE INVERSIONS

(71) Applicant: William C. Hughes, Woodstock, IL (US)

(72) Inventor: William C. Hughes, Woodstock, IL (US)

(73) Assignee: Innoquest, Inc., Woodstock, IL (US)

( * ) Notice: Subject to any disclaimer, the term of this patent is extended or adjusted under 35 U.S.C. 154(b) by 608 days.

(21) Appl. No.: 16/267,101

(22) Filed: Feb. 4, 2019

(65) Prior Publication Data

US 2019/0242762 A1    Aug. 8, 2019

Related U.S. Application Data

(60) Provisional application No. 62/710,060, filed on Feb. 7, 2018.

(51) Int. Cl.
*G01K 1/00* (2006.01)
*G01K 13/02* (2021.01)
(Continued)

(52) U.S. Cl.
CPC ........... *G01K 13/028* (2013.01); *G01K 1/045* (2013.01); *G01K 1/08* (2013.01); *G01K 1/146* (2013.01); *G01K 3/14* (2013.01); *G01K 13/024* (2021.01)

(58) Field of Classification Search
USPC .......................................................... 374/43
See application file for complete search history.

(56) References Cited

U.S. PATENT DOCUMENTS

2011/0226044 A1* 9/2011 Hughes ................. G01N 3/42
73/54.02

FOREIGN PATENT DOCUMENTS

DE  202017100310 U1 * 2/2017 ............. A47G 21/04
GB      2149300 A  * 6/1985 ............... A62C 3/00
JP    2006153787 A  * 6/2006

OTHER PUBLICATIONS

GRDC, Grains Research & Development Corporation; Northern, Southern and Western Regions the Influence of Surface Temperature Inversions On Spray Operations; Surface Temperature Inversions and Spraying Fact Sheet; Jul. 2014; 4 pages; Level 1, Tourism House, 40 Blackall Street, Barton ACT 2600, PO Box 5367, Kingston ACT 2604 IT +61 2 6166 4500 IF +61 2 6166 4599 IE grdc@grdc.com.au I W www.grdc.com.au.

(Continued)

*Primary Examiner* — Lisa M Caputo
*Assistant Examiner* — Nasir U. Ahmed
(74) *Attorney, Agent, or Firm* — Reinhart Boerner Van Deuren P.C.

(57) ABSTRACT

A handheld apparatus for measuring atmospheric temperature inversions consisting of a battery powered electronic display portion, a folding pole portion, and a temperature sensor protected from sources of heat radiation. An electronic circuit measures air temperatures at multiple heights accurately by automatically determining when readings have stabilized and reads a tilt sensor to assure temperature readings are at the proper height. Affixing said temperature sensor to the end of a pole while the opposite end is held in the user's hand facilitates waving of the temperature sensor end through the air to increase air flow, therefore, assuring quicker response and accurate air temperature readings. An electronic display indicates the presence and intensity of an atmospheric temperature inversion.

14 Claims, 3 Drawing Sheets

(51) Int. Cl.
*G01K 1/14* (2021.01)
*G01K 1/04* (2006.01)
*G01K 1/08* (2021.01)
*G01K 3/14* (2006.01)
G01K 13/024 (2021.01)

(56) References Cited

OTHER PUBLICATIONS

John W. Enz et al.; Air Temperature Inversions; Causes, Characteristics and Potential Effects on Pesticide Spray Drift; Nov. 2017; 16 pages; AE1705; NDSU Extension Service.

* cited by examiner

APPARATUS FOR MEASUREMENT OF ATMOSPHERIC TEMPERATURE INVERSIONS

CROSS-REFERENCE TO RELATED PATENT APPLICATION

This patent application claims the benefit of U.S. Provisional Patent Application No. 62/710,060, filed Feb. 7, 2018, the entire teachings and disclosure of which are incorporated herein by reference thereto.

FIELD OF THE INVENTION

The present invention is in the technical field of temperature measurement. More particularly, the present invention relates to temperature measurements of atmospheric air for the determination of the presence and intensity of atmospheric air temperature inversions.

BACKGROUND OF THE INVENTION

The use of chemicals to control weeds or pests is a common practice in commercial agriculture, horticulture, turf, and ornamental plant markets. It is also common practice to apply these chemicals by mixing them with water and spraying the solution onto the target field, plot, or plant. This spraying process produces water drops of differing sizes, the larger ones fall to the target within a few seconds, but the smaller ones can stay airborne for up to several hours depending on atmospheric conditions and are considered spray drift. Some chemicals can also volatilize into the atmosphere after they are on their target and after the water that carried them has evaporated. This chemical vapor can then be carried in the atmosphere under certain conditions and impact other plants, sometimes miles away. When plants or animals are affected by chemicals that were not the intended targets, the applicator of said chemicals can be held legally responsible for damages.

Therefore, it is of great importance to anyone who applies such chemicals that they avoid conditions that can lead to such off-target damage. Movement of spray drift and volatiles is affected by many factors including wind speed, spray nozzle design, pressure of solution supplied to the spray nozzle, air temperature, air humidity, and the presence of atmospheric temperature inversions to name a few. The presence of an atmospheric temperature inversion (inversion) can make damage from spray drift and volatiles 12 times more likely according to research professionals. It is therefore critical that applicators avoid atmospheric temperature inversions when applying such chemicals. There are many factors that affect inversions such as temperature, humidity, wind speed, time of day, cloud cover, type of ground cover, and color of the ground surface to name a few.

Regardless of all the factors that affect inversions they are defined by a simple property; the air temperature at a higher elevation is greater than the air temperature at a lower elevation. The magnitude of this temperature difference is denoted as the inversion intensity. This is the inverse, hence the name, of normal atmospheric conditions where temperature decreases with increasing elevation. Under normal conditions the lower warmer air rises through the colder upper air since this warm air has a lower density. Therefore, anything trapped in the warm air, like spray drift or volatiles, will be carried up into the atmosphere and dispersed vertically, thereby limiting off-target damage. When an inversion exists the colder denser air near the ground cannot rise through the warmer air above and is trapped near the ground where it can be carried by light winds for up to several miles and therefore transport any spray drift or volatiles with it.

Conventional practice for determining the presence of an atmospheric temperature inversion is to measure the air temperature at several elevations above the ground. In conventional practice, this is done with temperature sensors mounted on a fixed tower. This method is effective only for the location of the tower and as distance or terrain changes the accuracy of the inversion prediction is reduced or invalid. Therefore, a great many such towers would be needed to assure a chemical application at any given location in a county or state is not carried out during an inversion.

It would therefore be desirable to have a portable apparatus for measuring the presence of an inversion that an applicator can use at the exact location and time of the application. The desired device should be easily portable, trouble free to operate, and accurate. Embodiments of the present invention provide such a portable atmospheric temperature inversion measuring apparatus. These and other advantages of the invention, as well as additional inventive features, will be apparent from the description of the invention provided herein.

BRIEF SUMMARY OF THE INVENTION

Embodiments of the present invention provide an apparatus having a temperature sensor protected by solar radiation shields mounted on one end of a pole. The other end of the pole is attached to an electronic reader and display. In one embodiment, a battery powered electronic display instructs the user to take high and low temperature measurements and then calculates the presence and intensity of any atmospheric temperature inversion based on those temperatures. Embodiments of the present invention contain several features to assure the readings are accurate including a tilt or up/down sensor to assure proper elevation measurements were made and a software algorithm to determine when air temperature readings are stable. Further embodiments of the present invention assure proper airflow over the temperature sensor for accurate temperature readings by having the user wave the sensor end of the pole back and forth through the air. In particular embodiments, the apparatus includes a pole which may be folding or collapsible to aid in storage or transport of the apparatus. In some embodiments, the apparatus is designed to be entirely handheld.

In one aspect, embodiments of the invention provide an apparatus for measurement of atmospheric temperature inversions. The apparatus includes a temperature sensor portion having a temperature sensor, and an electronic display portion having an electronic display and a processor configured to output user-readable data to the electronic display. The processor is further configured to determine atmospheric temperature inversions based on a comparison of multiple temperature measurements. A pole portion has a first end and a send end. The first end is coupled to the temperature sensor portion and the second end is coupled to the electronic display portion. The pole portion is configured to maintain a spaced relation between the temperature sensor portion and the electronic display portion.

In a particular embodiment, the pole portion includes an upper pole, and a lower pole connected to the upper pole via a flexible coil spring hinge. When locked in a first position, a locking sleeve aligns the lower pole and upper pole along the same longitudinal axis. When locked in a second position, the locking sleeve allows the coil spring hinge to bend such that the upper pole and lower pole are side-by-side.

In some embodiments, a stop collar is disposed on the pole portion. The stop collar defines a positional limit of the locking sleeve when in the second position. In other embodiments, a tilt sensor provides data to the processor so that the processor can determine an orientation of the apparatus. Further, the temperature sensor portion may include one or more radiation shields to protect the temperature sensor from direct sunlight. The one or more radiation shields may include a first disc-shaped radiation shield above the temperature sensor and a second disc-shaped radiation shield below the temperature sensor when the temperature sensor portion is vertically oriented. In particular embodiments, the electronic display portion includes a power button and a battery compartment.

In another aspect, embodiments of the invention provide a method for measurement of atmospheric temperature inversion. The method includes using a pole-mounted apparatus, with a temperature sensor at one end and an electronic display at the other end, to take a first set of temperature measurements with the temperature sensor approximately three meters above the ground, and with the electronic display approximately two meters above the ground. The method also includes using the pole-mounted apparatus to take a second set of temperature measurements with the temperature sensor approximately one meter above the ground, and with the electronic display approximately two meters above the ground. Further, the method calls for automatically determining whether there is an atmospheric temperature inversion based on a comparison of the first and second sets of measurements. The method further requires displaying results of the automatic determination on the electronic display.

In certain embodiments, the method includes moving the temperature sensor through the air three meters above the ground to create an air flow across the temperature sensor. The method may also include folding the pole-mounted apparatus for storage or transport, wherein the temperature sensor and the electronic display are in closer proximity when the pole-mounted apparatus is folded. In particular embodiments, a flexible coil spring allows for folding of the pole-mounted apparatus, and a locking sleeve is positioned over the flexible coil spring to keep the pole-mounted apparatus in a straight unfolded position.

Embodiments of the method call for using the pole-mounted apparatus to take at least one temperature measurement per second. In particular embodiments, the pole-mounted apparatus takes from one to 10 temperature measurements per second. Furthermore, the method may include using the pole-mounted apparatus to take a first set of temperature measurements, which includes taking repeated temperature measurements until the measurements stabilize within a range of one degree Fahrenheit. In a more particular embodiment, the method calls for taking repeated temperature measurements until the measurements stabilize within a range of two-tenths of one degree Fahrenheit. In certain embodiments, the method requires automatically determining whether the pole-mounted apparatus is in the proper orientation to take temperature measurements, and displaying an error message on the electronic display if the pole-mounted apparatus is not in the proper orientation to take temperature measurements.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in conjunction with certain preferred embodiments, there is no intent to limit it to these embodiments. On the contrary, the intent is to cover all alternatives, modifications and equivalents as indicated within the spirit and scope of the invention as defined by the appended claims.

DETAILED DESCRIPTION OF THE INVENTION

Figure 1:
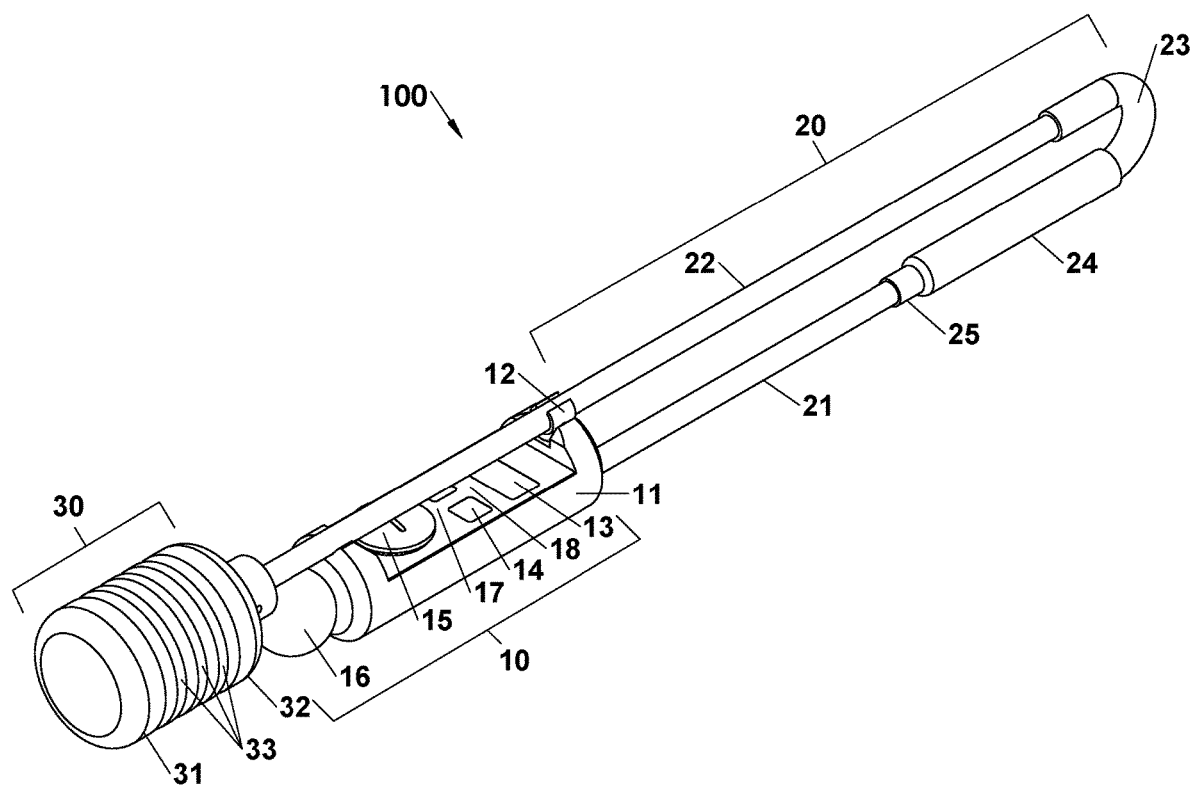
FIG. 1 is a perspective view of an apparatus for measurement of atmospheric temperature inversions with the pole folded in accordance with an embodiment of the invention.
Figure 2:
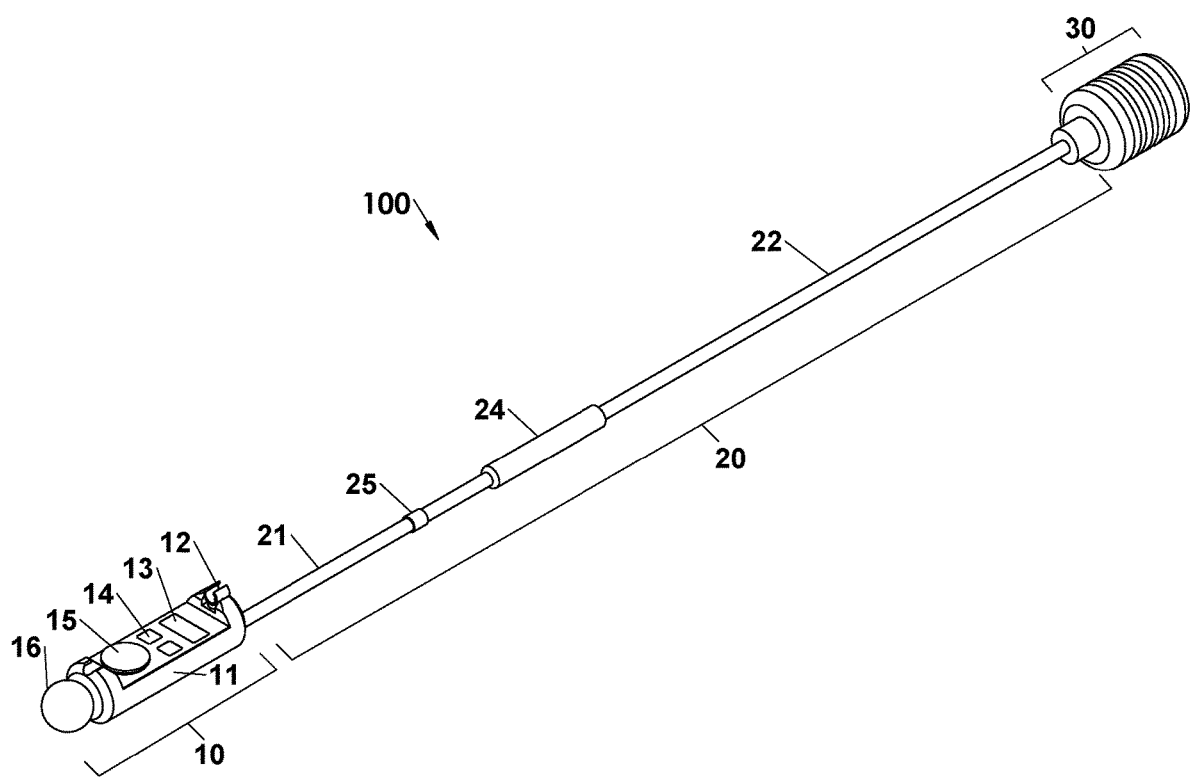
FIG. 2 is a perspective view of the apparatus for measurement of atmospheric temperature inversions of FIG. 1 with pole unfolded, according to an embodiment of the invention.
Figure 3:
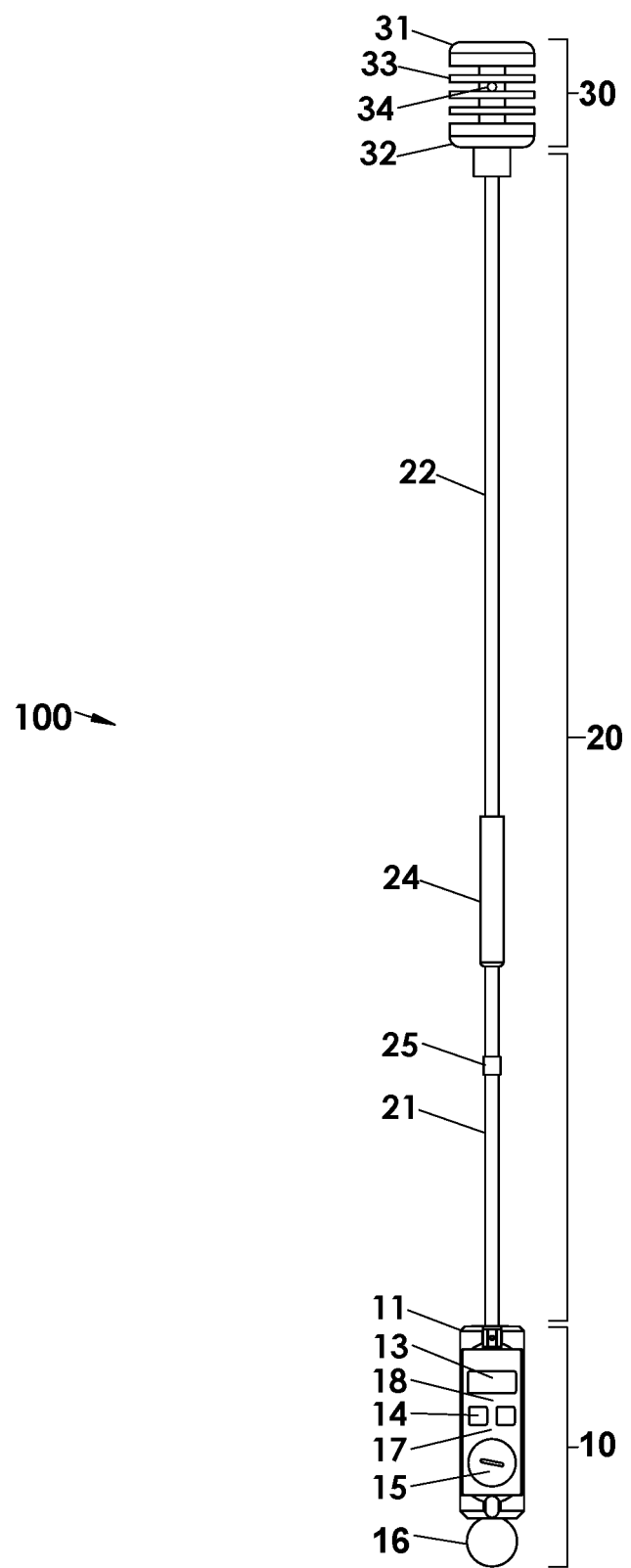
FIG. 3 is a front view of the apparatus for measurement of atmospheric temperature inversions of FIG. 2, according to an embodiment of the invention.

An apparatus 100 for measurement of atmospheric temperature inversions, constructed in accordance with an embodiment of the invention, is shown in FIGS. 1-3. The particular embodiment shown includes an electronic display portion 10, a pole portion 20, and a temperature sensor portion 30, as shown in FIGS. 1-3. These components combine, as shown in FIGS. 2 and 3 to form a pole with a display device on one end a temperature sensing device on the other end. This allows the temperature sensor portion 30 to be placed in one location while the readings can be presented by electronic display portion 10 in another location separated from the first by a distance equal to the length of pole 20. For certain embodiments, this allows for temperature measurements above a user holding electronic display portion 10 equaling the height of their reach plus the length of pole 20. Similarly, a user can hold temperature sensor portion 30 at a height close to the ground while holding the electronic display portion 10 at convenient eye level due to length of pole 20. It is therefore apparent that the design of the apparatus 100 allows a user to both take a temperature measurement close to the ground and over their head with convenience. As shown in FIG. 1, pole 20 may be folded to reduce the overall length of the apparatus 100 for more convenient transport and storage.

A particular embodiment of the apparatus 100 for measurement of atmospheric temperature inversions functions in the following manner. The user first unfolds the pole 20 by removing upper pole section 22 from retaining clip 12. Upper pole section 22 is then rotated 180 degrees about coil spring hinge 23 until it is in line with lower pole section 21 as shown in FIG. 2. Locking sleeve 24 is then slid along lower pole section 21 and coil spring hinge 23 until this locking sleeve covers all of coil spring hinge 23, as shown in FIG. 2. Coil spring hinge 23 is flexible but when fully covered by ridged locking sleeve 24, lower pole section 21 and upper pole section 22 form a stiff continuous pole 20 (i.e., aligned along the same longitudinal axis) as shown in FIGS. 2-3. Locking sleeve 24 is held into the locked or unlocked position by friction. The user then presses a power button 14 to turn on the electronic display 10. Instructions are then automatically shown on the display 13 to remind the user how to properly use the device. The electronic display portion 10 instructs the user to hold the ball end 16 at a height of two meters above the ground. The user then must let the temperature sensor portion 30 hang straight down from ball end 16 such that temperature sensor 34 is placed about one meter above the ground due to the length of pole 20. The user now waves the temperature sensor portion 30 back and forth through the air while holding ball end 16 at two meters.

In a particular embodiment, the software in the electronic display portion 10 then reads the temperature sensor 34 at least once per second and determines if consecutive readings show a change in temperature. In a more particular embodiment, the software in the electronic display portion 10 then reads the temperature sensor 34 from one to 10 times per second and determines if consecutive readings show a change in temperature. If a significant change in temperature is detected, then readings continue. However, if the change in consecutive readings is small, then the temperature is considered accurate by the software and saved as the lower air temperature reading. The user is then instructed to hold the temperature sensor portion 30 directly vertical above ball end 16 while continuing to hold ball end 16 at two meters. Therefore, temperature sensor 34 is now located about three meters above the ground due to the length of pole 20. The user now waves the temperature sensor portion 30 back and forth through the air while holding ball end 16 at two meters.

As with the lower air temperature reading, the software running on electronic display portion 10 waits until temperature readings have stabilized and then saves the upper air temperature reading. In one example, the temperature readings are considered to be stabilized when the readings are within plus or minus one-half degree Fahrenheit of the nominal reading, i.e., a total range of one degree Fahrenheit. Depending on the circumstances, the acceptable total range of variation may be larger or smaller than one degree Fahrenheit. In another example, the temperature readings are considered to be stabilized when the readings are within plus or minus one-tenth of one degree Fahrenheit of the nominal reading, i.e., a total range of two-tenths of one degree Fahrenheit.

Once the temperature measurements have stabilized and been saved, the software calculates the difference between the upper and lower air temperatures and displays this value on display 13. If this value is positive (higher upper temperature), then display 13 also indicates that an inversion is present. If the value is negative, then display 13 will indicate that no inversion exists. Once complete, the user may instruct electronic display portion 10 to take another inversion measurement, or the unit may be shut off and refolded as shown in FIG. 1 such that retaining clip 12 holds upper pole section 22 securely in the folded position and locking sleeve 24 rests against stop collar 25.

Additional features that assure accurate inversion detection are as follows. During readings of the upper and lower temperatures, a software algorithm on electronic display portion 10 also reads a tilt sensor 17 contained inside housing 11. The readings from this tilt sensor 17 are used to determine an orientation of the apparatus and to confirm that the user is holding the device with the pole 20 pointing down during the lower air temperature measurement and that pole 20 is pointing up during the upper air temperature measurement relative the electronic display portion 10. If improper orientation is detected during either reading sequence, then an error message is displayed in place of a proper reading value on display 13. Additionally, temperature sensor 34 is protected from solar and other sources of heat radiation by the incorporation of radiation shields 31, 32, 33 that comprise temperature sensor portion 30. In particular embodiments, these shields 31, 32, 33 are white in color to reflect as much heat energy as possible. As shown in FIG. 3, these shields 31, 32, 33 are spaced apart to allow air to flow to the temperature sensor 34, but make it difficult for radiated heat energy to directly reach this temperature sensor 34 from most angles.

Referring again to FIGS. 1-3, the electronic display portion 10 is described in more detail. Electronic display portion 10 is comprised of a housing 11 and ball end 16 and contains a circuit board with display 13 and buttons 14 as well as battery compartment 15 configured to hold the batteries used to power the apparatus 100. Housing 11 is molded or machined from plastic, metal, or some other suitable material to provide a method of holding lower pole 21 and retaining clip 12, in addition to the components already mentioned. Housing 11 serves two functions. First, it contains the electronic circuit and battery, and second, it serves as a handle for holding the apparatus 100 during use. The size of housing 11 is selected to fit easily into a user's hand while providing adequate visibility of display 13 and buttons 14. Housing 11 is sealed against dust and rain since the apparatus 100 is designed for outdoor use.

Referring to FIGS. 1 and 2, pole portion 20 is described in more detail. Pole portion 20 may be fixed or foldable. A particular embodiment of apparatus 100 has a folding pole portion 20 which is comprised of upper pole 22, lower pole 21, coil spring hinge 23, locking sleeve 24 and stop collar 25. In certain embodiments, pole 20 is hollow to allow a wire to pass between the electronic display portion 10 and the temperature sensor portion 30. Coil spring hinge 23 is also hollow to allow said wire to pass through its center whether it is folded or straight. Upper pole 22 and lower pole 21 are constructed of a lightweight, rigid material such that flexing of pole 20 is minimal while temperature sensor portion 30 is waved through the air. While many materials may fill this need, in certain embodiments of the invention, pole 20 is constructed of a composite material like fiberglass or carbon fiber. Lower pole 21 is affixed to housing 11 and to one end of coil spring hinge 23, while upper pole 22 is affixed to the other end of coil spring hinge 23 and to temperature sensor portion 30.

Referring again to FIGS. 1 and 2, coil spring hinge 23 and locking sleeve 24 are described in more detail. Coil spring hinge 23 may be made of metal or plastic rod formed into a tight coil similar to an extension spring. Coil spring hinge 23 may also be made from some flexible material similar to rubber tubing or hose with or without embedded reinforcing material. In a particular embodiment of the invention, coil spring hinge 23 is constructed of stainless steel extension spring stock. The diameter of coil spring hinge 23 is selected to be a press fit onto upper and lower poles 21, 22, such that no additional adhesive or affixing method is necessary.

Locking sleeve 24 is sized to fit closely over the outside diameter of coil spring hinge 23, but not too tight that locking sleeve 24 cannot be easily slid back and forth with hand and finger pressure. Locking sleeve 24 is constructed of a rigid material that has a similar stiffness to upper and lower poles 21, 22. When locking sleeve 24 is slid over coil spring hinge 23, as shown in FIGS. 2 and 3, coil spring hinge 23 is no longer able to flex, and is held straight by locking sleeve 24.

Since upper and lower poles 21, 22 are affixed to coil spring hinge 23, they are therefore also held straight when locking collar 24 is slid over coil spring hinge 23. To fold upper and lower poles 21, 22 such that the upper and lower poles are side-by-side, as shown in FIG. 1, locking sleeve 24 must be slid back to stop collar 25 as shown. Stop collar 25 provides a method of keeping the locking sleeve 24 from sliding completely free of coil spring hinge 23 when the upper and lower poles 21, 22 are folded as shown in FIG. 1. While this is not required, it facilitates use of the locking sleeve 24, since realignment of said sleeve's inside diameter over coil spring hinge's 23 outside diameter is not required for each locking cycle.

With reference to FIG. 3, temperature sensor portion 30 is now described in more detail. Temperature sensor portion 30 is affixed to upper pole 22. Temperature sensor 34 is located inside temperature sensor portion 30, as shown in FIG. 3, such that it does not touch any of the radiation shields 31, 32, 33. In particular embodiments, the radiation shields 31, 32, 33 are constructed of white plastic but could be of a different material provided it reflects heat energy well. Radiation shields 31, 32, 33 are essentially plates stacked on top of each other with a gap in between to allow air to flow through. As temperature sensor portion 30 is waved through the air during use, air passes between the radiation shields 31, 32, 33 to come in contact with temperature sensor 34. If sunlight were allowed to shine directly on temperature sensor 34, it would register a temperature higher than the true air temperature due to this heating. The radiation shields 31, 32, 33 provide shade from this sunlight heating and assure air temperature readings are as accurate as possible. Inner radiation shields 33 are designed with a large central hole similar to a donut while end cap radiation shields 31 and 32 are closed with no central hole to block heat radiation. The large central hole in inner shields 33 allows for clearance between the temperature sensor 34 and for increased air flow around said sensor 34.

While a particular embodiment of the apparatus 100 has been described in detail above, it is also recognized that, in alternate embodiments of the invention, the electronic circuit and display could be located adjacent to temperature sensor portion 30 with just a handle attached to opposite end of pole portion 20. It is also recognized by this invention that communication of temperature readings between temperature sensor portion 30 and electronic display portion 10 could be by wireless data transmission. It is also envisioned that temperature data could be transmitted wirelessly to a user's smart phone or tablet computer as additional ways of storing or displaying temperature inversion values.

Particularly unique features of the present invention are as follows. An apparatus 100 for measuring atmospheric air temperature inversions comprising an electronic circuit board and display in a housing that measures a temperature sensor located along a pole some distance from the opposite end of the pole which is held by the user. The electronic circuit runs software that interprets sensor data and determines if an inversion is present.

A further unique feature of the invention is the waving of the temperature sensor through the air by motion of the pole in the user's hand. A further unique feature is the use of the tilt sensor 17 to allow the invention to determine what angle or direction relative to up or down the pole is pointing. A further unique feature is that the processor 18 runs a software program that contains an algorithm to determine when the change in temperature over time has reach a relatively small amount and waits until such time before saving an air temperature reading.

A further unique feature of the invention is the addition of radiation shields around the temperature sensor to limit the effect of solar radiation or other sources of heat radiation on the measured air temperature value. A further unique feature is the addition of a folding or collapsible pole such that the storage or transport configuration of the invention is smaller than the configuration used during measurements. A further unique feature is that the above-described invention may be completely handheld both during transport and use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for measurement of atmospheric temperature inversions, the apparatus comprising:
    a temperature sensor portion having a temperature sensor;
    an electronic display portion having an electronic display and a processor configured to output user-readable data to the electronic display, the processor further configured to determine atmospheric temperature inversions based on a comparison of multiple temperature measurements; and
    a pole portion with a first end and a second end, the first end coupled to the temperature sensor portion and the second end coupled to the electronic display portion, the pole portion configured to maintain a spaced relation between the temperature sensor portion and the electronic display portion;
    wherein the pole portion comprises:
        an upper pole;
        a lower pole connected to the upper pole via a flexible coil spring binge; and a locking sleeve which, when locked in a first position, aligns the lower pole and upper pole along the same longitudinal axis, and which, when locked in a second position, allows the coil spring hinge to bend such that the upper pole and lower pole are side-by-side.

2. The apparatus of claim 1, further comprising a stop collar disposed on the pole portion, the stop collar defining a positional limit of the locking sleeve when in the second position.

3. The apparatus of claim 1, further comprising a tilt sensor which provides data to the processor, wherein the processor uses the data to determine an orientation of the apparatus.

4. The apparatus of claim 1, wherein the temperature sensor portion includes one or more radiation shields to protect the temperature sensor from direct sunlight.

5. The apparatus of claim 4, wherein the one or more radiation shields comprises a first disc-shaped radiation shield above the temperature sensor and a second disc-shaped radiation shield below the temperature sensor when the temperature sensor portion is vertically oriented.

6. The apparatus of claim 1, wherein the electronic display portion includes a power button and a battery compartment.

7. A method for measurement of atmospheric temperature inversion comprising the steps of:
using a pole-mounted apparatus, with a temperature sensor at one end and an electronic display at the other end, to take a first set of temperature measurements such that the temperature sensor approximately three meters above the ground, and such that the electronic display approximately two meters above the ground;
using the pole-mounted apparatus to take a second set of temperature measurements with the temperature sensor approximately one meter above the ground, and with the electronic display approximately two meters above the ground;
automatically determining whether there is an atmospheric temperature inversion based on a comparison of the first and second sets of measurements;
displaying results of the automatic determination on the electronic display; and
folding the pole-mounted apparatus for storage or transport, wherein the temperature sensor and the electronic display are in closer proximity when the pole-mounted apparatus is folded.

8. The method of claim 7, wherein using the pole-mounted apparatus to take a first set of temperature measurements comprises moving the temperature sensor through the air three meters above the ground to create an air flow across the temperature sensor.

9. The method of claim 7, wherein a flexible coil spring allows for folding of the pole-mounted apparatus, and wherein a locking sleeve is positioned over the flexible coil spring to keep the pole-mounted apparatus in a straight unfolded position.

10. The method of claim 7, wherein using the pole-mounted apparatus to take a first set of temperature measurements comprises using the pole-mounted apparatus to take at least one temperature measurement per second.

11. The method of claim 7, wherein using the pole-mounted apparatus to take a first set of temperature measurements comprises using the pole-mounted apparatus to take from one to 10 temperature measurements per second.

12. The method of claim 7, wherein using the pole-mounted apparatus to take a first set of temperature measurements comprises taking repeated temperature measurements until the measurements stabilize within a range of one degree Fahrenheit.

13. The method of claim 12, wherein using the pole-mounted apparatus to take a first set of temperature measurements comprises taking repeated temperature measurements until the measurements stabilize within a range of two-tenths of one degree Fahrenheit.

14. The method of claim 7, further comprising automatically determining whether the pole-mounted apparatus is in the proper orientation to take temperature measurements, and displaying an error message on the electronic display if when the pole-mounted apparatus is not in the proper orientation to take temperature measurements.

* * * * *

UNITED STATES PATENT AND TRADEMARK OFFICE
CERTIFICATE OF CORRECTION

PATENT NO. : 11,313,738 B2
APPLICATION NO. : 16/267101
DATED : April 26, 2022
INVENTOR(S) : William C. Hughes It is certified that error appears in the above-identified patent and that said Letters Patent is hereby corrected as shown below:

In the Claims

Claim 1, Column 8, Line 67 reads "coil spring binge; and" should read --coil spring hinge; and--

Claim 14, Column 10, Line 38 reads "and displaying an error message on the electronic display if" should read --and displaying an error message on the electronic display--

Signed and Sealed this
Thirty-first Day of May, 2022

Katherine Kelly Vidal
*Director of the United States Patent and Trademark Office*